United States Patent [19]

Foldes

[11] 4,237,513

[45] Dec. 2, 1980

[54] THERMOCONSTRICTIVE DISCONNECT OF CONDUCTORS IN ELECTRICAL APPARATUS

[76] Inventor: Stephen Foldes, 5 Riverside Dr., Binghamton, N.Y. 13905

[21] Appl. No.: 954,369

[22] Filed: Oct. 25, 1978

[51] Int. Cl.$^3$ .................................... H02H 5/04

[52] U.S. Cl. .................... 361/103; 174/DIG. 8; 337/298; 337/415; 361/105; 361/25

[58] Field of Search .................. 361/103, 105, 37, 25, 361/26, 27; 337/333, 336, 362, 377, 394, 395, 397, 398, 401, 403, 409, 157, 354, 346, 298, 415; 200/61.08; 83/13, 523, 580, 701; 174/DIG. 8; 102/27 R, 28 R, 28 EB; 339/30, DIG. 1

[56] References Cited

U.S. PATENT DOCUMENTS

| | | | |
|---|---|---|---|
| 2,531,115 | 11/1950 | Doak | 337/333 |
| 2,758,255 | 8/1956 | Lytle | 361/105 X |
| 2,934,622 | 4/1960 | Massar | 337/157 X |
| 3,622,941 | 11/1971 | Wetmore | 174/DIG. 8 |
| 3,715,697 | 2/1973 | Them | 337/333 X |
| 4,030,061 | 6/1977 | Gaskell et al. | 361/103 X |
| 4,134,092 | 1/1979 | Lavigne et al. | 337/415 |

*Primary Examiner*—Patrick R. Salce
*Attorney, Agent, or Firm*—Frederick E. Bartholy

[57] ABSTRACT

A protective disconnect to prevent overheating of electrical apparatus is described. The device consists of a cutting member accepting a conductor and capable, upon closure, of severing said conductor. The cutting member is surrounded by a thermoconstrictive material which, upon being subjected to heat at a certain temperature, actuates said member.

2 Claims, 9 Drawing Figures

THERMOCONSTRICTIVE DISCONNECT OF CONDUCTORS IN ELECTRICAL APPARATUS

Protective devices to prevent damage to electrical apparatus due to overheating have been used in various forms. A short circuit results in sudden overheating and fuses which disrupt the current by melting at a certain temperature have been in use since the time of installation of electrical service.

A given rise in temperature from that of the ambient is normal in various electrical apparatus or components thereof which operate either from a local power source or from batteries placed within the apparatus. However, a rise beyond a certain value may be due to component malfunction which gradually builds up until complete breakdown occurs. The latter may cause damage to other components of the assembly and, in addition, presents a fire hazard which may have serious consequences.

The present invention is not directed to respond to overload conditions in electrical apparatus, but has the primary object of sensing changes in temperature which may slowly rise beyond a predetermined level, thereby endangering its normal function. It provides means for automatically actuating a disconnect upon exceeding a predetermined temperature level.

It is a particular feature of the invention that damage to electrical apparatus due to overheating is prevented by sensing the rise in temperature from that which is normally expected in accordance with the design parameters thereof, and to act effectively when the temperature exceeds a predetermined value by disconnecting the component or the entire assembly from the power source. The disconnect is effected by actual severing of the conductor supplying the part or parts in question.

The heat-reactive disconnect in accordance with the invention has the advantages of extreme simplicity of construction, ease of assembly, and utilization of components which are readily available or may easily be made in large quantities.

Other objects, features and advantages will be apparent from the following description of the invention, pointed out in particularity in the appended claims, and taken in connection with the accompanying drawings, in which:

FIG. 1 is a view, in perspective, of the disconnect means comprising a wire cutter accepting a conductor, and a thermoconstrictive sleeve in alignment to be placed thereon.

Thermoconstrictive sleeves in accordance with the invention herein described are commercially available heat-reactive tubings. These have the inherent property of shrinkage upon application of heat. They are available in different sizes as far as length and diameter are concerned and may be purchased under various brand names, such as for example, "ScotchTite" ®, made by Minnesota Mining & Manufacturing Company.

FIG. 2 illustrates the assembly of the cutter and the sleeve surrounding it. For the sake of simplicity of illustration, a conductor is shown placed within the cutting portion and the sleeve is shown as being transparent. It is to be understood that thermoconstrictive sleeves are generally opaque.

Figure 9:
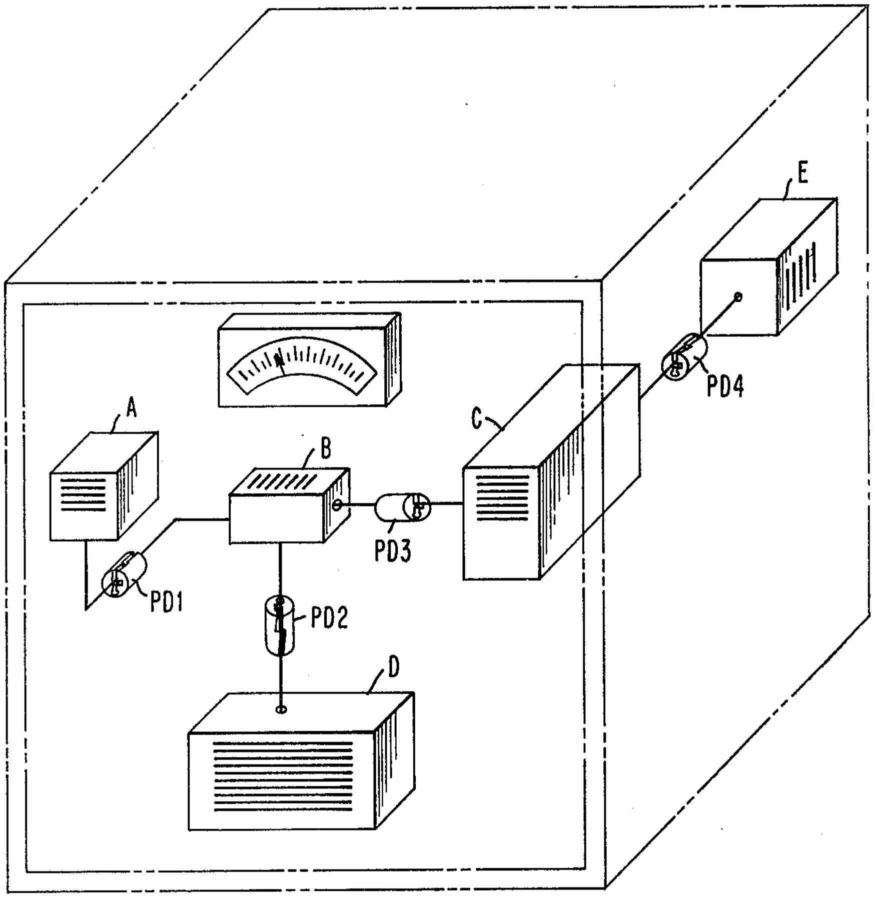

FIG. 9 is a phantom view illustrating various components of an electronic apparatus with the disconnect means of the present invention placed at strategic locations. Its purpose is to show that, within an operative assembly, various parts may be protected at different temperature levels. This will prevent total damage when overheat protection in an assembly is reserved to a component which has the lowest tolerance in rise of operating temperature.

Figure 1:
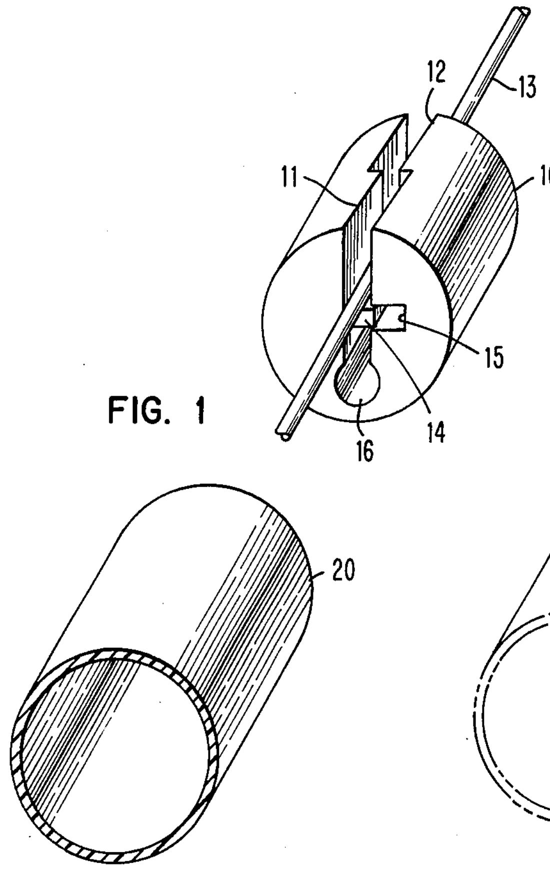

Referring to the figures, it is seen in FIG. 1 that the disconnect means in accordance with the invention consists of a cylindrically-shaped wire cutter body 10 having jaws 11 and 12 between which the wire 13 is placed.

As can be seen, the cutter 10 has a narrow body portion 16 in order to provide flexibility and a pivot point over which it can be constrained in order to close the jaws 11 and 12. A tongue 14 fits into the groove 15 in order to guide and maintain alignment of the cutter jaws 11 and 12. The tongue 14 also serves as a support on which the wire 13 rests while the assembly is in normal inoperative position.

The heat-reactive sleeve 20 is shown in alignment with the cutter 10 to be placed thereon to complete the heat-reactive disconnect assembly.

The cutter 10 may be made of various types of nonconductive materials, namely, ceramics, plastics, phenolic resins, etc., which can easily be molded and have the strength to cut the wire 13. In electronic applications utilizing solid state components, the wire 13 to be cut would seldom be of heavy gauge and the invention is particularly directed to electronic gear and not electrical conduits.

Figure 2:
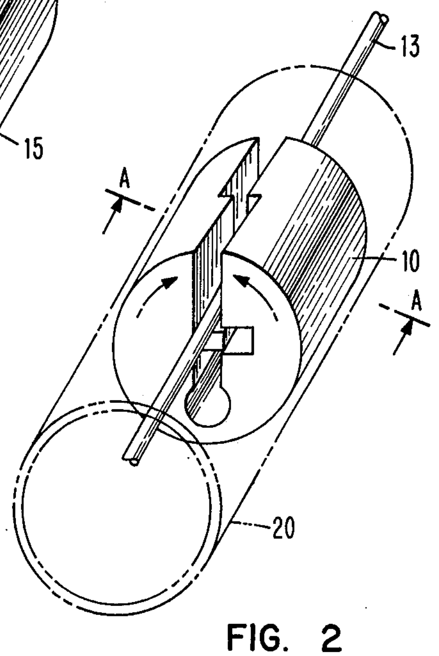

Referring to FIG. 2, it is seen that the thermoconstrictive sleeve 20 is placed over the cutter 10 whereby the overheat protective assembly is completed.

Figure 4:
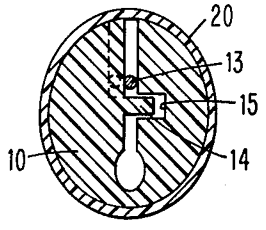
FIG. 4 is a similar view showing the cutting jaws in closed condition with the conductor severed.
Figure 3:
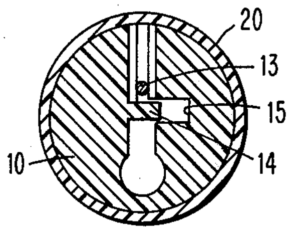
FIG. 3 is a sectional view along line A—A, prior to closing of the jaws of the disconnect cutter.
Figure 5:
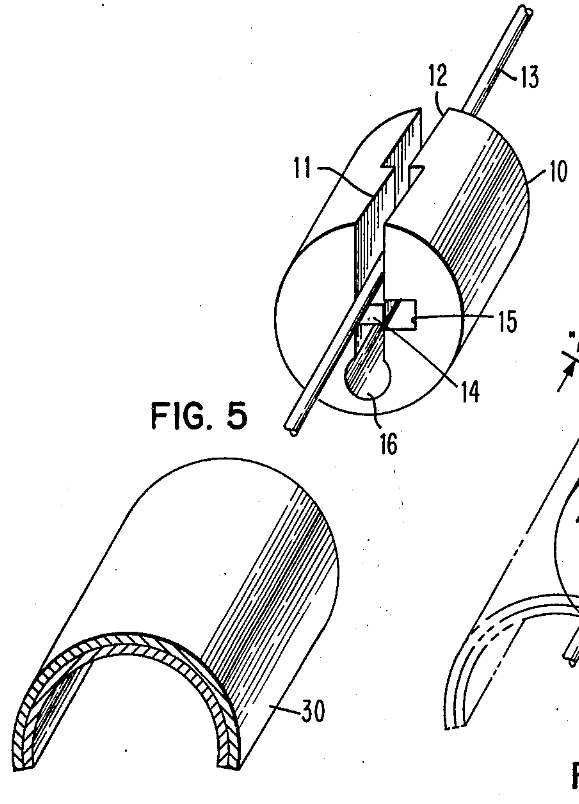
FIG. 5 illustrates that an overheating disconnect may also be achieved, in accordance with the invention, by utilizing bimetallic elements in the form of a clamp in place of the thermoconstrictive sleeve.
Figure 6:
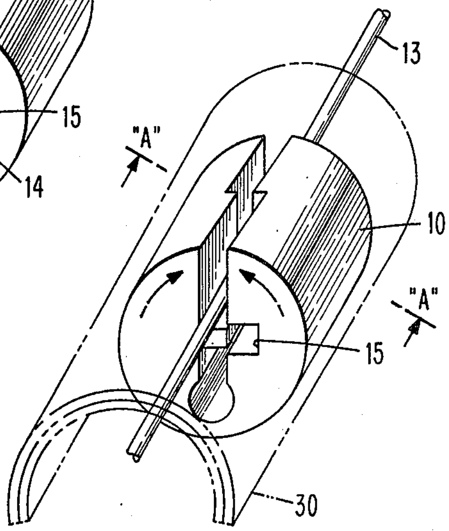
FIG. 6 illustrates the assembly of the cutter and a phantom view of the bimetallic clamp.
Figure 8:
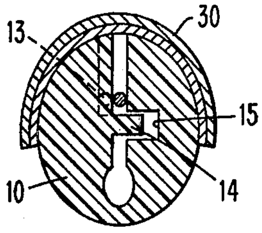
FIG. 8 is a view similar to FIG. 7 showing the cutting jaws closed and the conductor severed.
Figure 7:
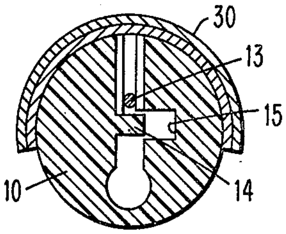
FIG. 7 is a sectional view taken along line A—A of FIG. 6 illustrating the cutter prior to closure.

The sectional view of FIG. 3 shows the completed unit prior to actuation. A similar view in FIG. 4 shows the result when, due to heat shrinkage of the sleeve 20, the jaws 11 and 12 of the cutter 10 are forced to close and the wire 13 is severed.

The above described simple and effective protective device may be installed in various places in an electronic apparatus.

The action of a thermoconstrictive sleeve may also be achieved in accordance with the invention by utilizing a bimetallic element in the form of a clamp in place of the thermoconstrictive sleeves. This is illustrated in FIGS. 5 through 8 in a manner similar to the previous figures, except for the use of the clamp 30 in place of the sleeve 20. Since all the other components are the same as in FIGS. 1 through 3, identical reference characters are used in FIGS. 5, 6, 7 and 8.

FIG. 9 in a phantom view intends to illustrate that several components shown, such as A, B, C, D and E, may be individually protected. Each of these may have an overheat protective device illustrated as PD1, PD2, PD3, PD4, and PD5. Any one of these may have a particular temperature sensitivity as to overheat. It is, therefore, possible in many instances that, if one of the components thereof fails, a device may perform its intended function until a replacement can be obtained. Consequently, the thermal-responsive disconnects may be so chosen that the component most sensitive to overheat is protected at a predetermined temperature while the others are protected at other selected temperatures. The choice is simply determined by the selection of the temperature-response characteristics of the constrictive sleeve or bimetallic clamp. Thus an electronic assembly need not be completely inoperative. As a matter of fact, the component shut off by severing of its supply conductor may allow function of the unit while the defective component which overheated and became disconnected by the protective device is removed from its supply source for repair or replacement.

As a practical example of the operation of the cutting device, a piece of 36 AWG insulated copper wire was placed into the cutter constructed substantially as shown in the illustration. The material of the cutter was a transfer-molded, glass-filled epoxy. The cutter was then slipped inside a heat-shrinkable polyester tube (manufactured by Niemand Bros., Inc.) of a close fitting inside diameter, and a wall thickness of approximately 0.015 inch. Heat was applied by means of a stream of hot air and, upon reaching the shrink temperature of the tubing (approximately 130° C.), the wire was severed.

This invention in its broader aspects is not limited to the specific embodiments herein shown and described but departure may be made therefrom within the scope of the accompanying claims, without departing from the principles of the invention and without sacrificing its chief advantages.

What is claimed is:

1. Overheating protection for electrical apparatus having internal wirings, including a conductor carrying current vital to the operation of said apparatus, disconnect means comprising a shearing member, having cutting jaws engaging said conductor and a covering of thermoconstrictive material surrounding said shearing member, said material having a coefficient of constriction at a selected temperature sufficient to produce a force for closing said jaws and thereby severing said conductor.

2. Disconnect means in accordance with claim 1, wherein said shearing member is of plastic material of cylindrical shape having cutting edges adapted to surround a conductor and, cutting said conductor upon compression by said thermoconstrictive material.

* * * * *